(No Model.)
F. A. KELLEY.
GUARD FINGER FOR MOWING MACHINES.
No. 577,482. Patented Feb. 23, 1897.
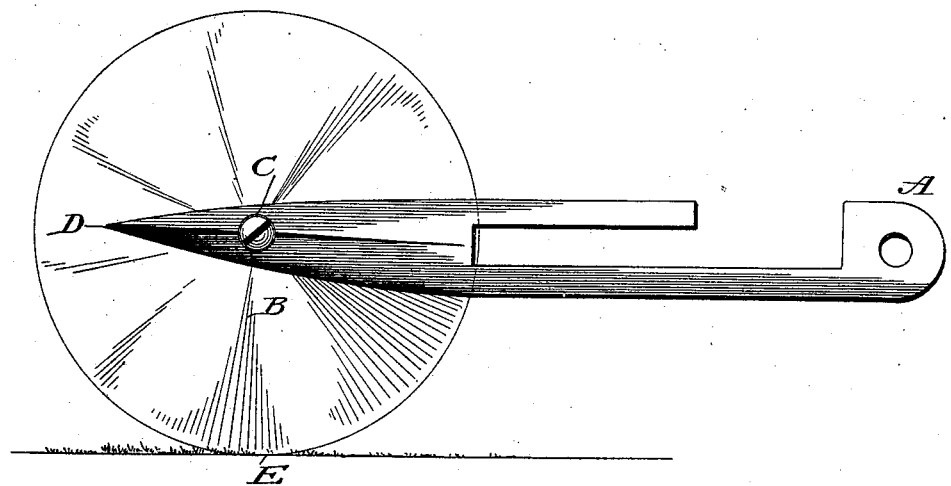
Witnesses.
S. F. Bangham
N. D. McKinsey
Inventor.
Frank A. Kelley

United States Patent Office.

FRANK A. KELLEY, OF SUSANVILLE, CALIFORNIA.

GUARD-FINGER FOR MOWING-MACHINES.

SPECIFICATION forming part of Letters Patent No. 577,482, dated February 23, 1897.

Application filed October 15, 1895. Serial No. 565,810. (No model.)

*To all whom it may concern:*

Be it known that I, FRANK A. KELLEY, of Susanville, county of Lassen, State of California, have invented a new and useful Improvement in Guard-Fingers for Mowing-Machines; and I do hereby declare that the following is a full, clear, and exact description of the invention, reference being had to the drawing accompanying this specification and forming a part of the same.

The object of my invention is to provide a device whereby the points of each and all of the guard-fingers of a mowing-machine will always be kept free and clear of any and all grass, mice-nests, moss, cattle-chips, sticks, or other obstructions and thereby prevent the clogging of the guards and stopping of the machine. This I accomplish by means of a small vertical wheel of the proper diameter, shape, and thickness, which wheel is attached onto either side or in a slot made in the center of each guard and projecting slightly beyond the points of the guards, all as hereinafter described.

The drawing is a side elevation showing the wheel attached to the side of the guard-finger.

In the drawing, A represents the guard-finger of a mowing-machine, and B a small wheel having a sharp or cutting edge on its circumference and a hole in its center. This wheel is attached to the guard at C by means of a rivet, bolt, or screw which passes through a hole or screws into the guard and forms the axis for the wheel and being drawn just tight enough to permit the wheel to revolve freely and close to the guard. This wheel extends a short distance beyond the point of the guard, as shown at D, so that all obstructions come against it instead of against the point of the guard, as they now do. This wheel also extends down and low enough to rest on the grass and ground, as shown at E, and with sufficient force that when the machine is drawn forward the friction of the wheel on or running in the ground will revolve and cut or roll under it any such or other obstructions usually found on a meadow.

The wheel can be sharp or not, or ragged on its periphery, but I prefer to use a sharp solid wheel, and it also need not extend quite to or project beyond the point of the guard, but I deem it advantageous to have it extend some distance farther out than the point of the guard. The wheel should be made of steel or other hard material and heavier and thicker in the center and with a gradual taper from its center to the rim, thereby making it stronger and presenting more wearing-surface for its axle.

The guard-finger should be made flat on the side where the wheel works, so as to give the wheel all the side support possible when turning the machine, and for the same reason the wheel should be on the right-hand side of the guard.

I am aware that the guard-finger itself is old, and therefore I do not claim it when used as it now is and without a wheel; but I do claim the attachment of the wheel to the guard to be new and useful when used in combination with the guard, as above described.

The device is extremely simple, cheap, and can be attached to the guards or detached from them in a few minutes, and enables one to mow without the frequent clogging of the guards and knife and stopping of the machine.

Having thus described my invention, what I claim as new and useful, and desire to secure by Letters Patent, is—

In a mower, the combination with the guard-finger thereof, of a vertical wheel attached thereto, said wheel provided with a cutting edge adapted to travel on the ground in front of the guard-finger journaled on either side or in a slot thereof in the manner and for the purpose set forth.

FRANK A. KELLEY.

Witnesses:
JOHN JAY PARDY,
S. F. BANGHAM.